US009953184B2

(12) United States Patent
Arasu et al.

(10) Patent No.: US 9,953,184 B2
(45) Date of Patent: Apr. 24, 2018

(54) CUSTOMIZED TRUSTED COMPUTER FOR SECURE DATA PROCESSING AND STORAGE

(71) Applicant: Microsoft Technology Licensing, LLC, Redmond, WA (US)

(72) Inventors: Arvind Arasu, Redmond, WA (US); Kenneth Hiroshi Eguro, Seattle, WA (US); Ravishankar Ramamurthy, Redmond, WA (US); Kaushik Shriraghav, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 159 days.

(21) Appl. No.: 14/690,354

(22) Filed: Apr. 17, 2015

(65) Prior Publication Data
US 2016/0306995 A1  Oct. 20, 2016

(51) Int. Cl.
*H04L 29/06* (2006.01)
*G06F 21/62* (2013.01)
*G06F 17/30* (2006.01)

(52) U.S. Cl.
CPC .... *G06F 21/6227* (2013.01); *G06F 17/30466* (2013.01); *G06F 17/30477* (2013.01); *G06F 21/6218* (2013.01); *G06F 21/6236* (2013.01)

(58) Field of Classification Search
CPC ........ G06F 21/31; G06F 21/60; G06F 21/606; G06F 21/62; G06F 21/6218; G06F 21/6227; G06F 2221/2107
USPC .............. 726/26–30; 713/165–167, 189, 193
See application file for complete search history.

(56) References Cited

U.S. PATENT DOCUMENTS

| 5,956,400 | A  | * | 9/1999 | Chaum | H04L 29/06 380/28 |
| 6,226,745 | B1 |   | 5/2001 | Wiederhold | |
| 6,691,132 | B2 |   | 2/2004 | Walker et al. | |
| 7,500,111 | B2 | * | 3/2009 | Hacigumus | G06F 17/30471 380/279 |
| 8,041,706 | B2 | * | 10/2011 | Agrawal | G06F 17/30545 707/714 |
| 8,352,495 | B2 | * | 1/2013 | LaRowe | G06F 17/30979 707/736 |

(Continued)

FOREIGN PATENT DOCUMENTS

EP    2779520 A1    9/2014

OTHER PUBLICATIONS

Agrawal et al., "Order-Preserving Encryption for Numeric Data", In Proceedings of the ACM SIGMOD International Conference on Management of Data, Jun. 13, 2004, 12 pages.

(Continued)

*Primary Examiner* — Hosuk Song

(57) ABSTRACT

The techniques discussed herein facilitate the transmission, storage, and manipulation of data in an encrypted database management system (EDBMS). An untrusted machine is connected to a data store having encrypted records, a client machine that sends encrypted queries, and a trusted machine that receives and decrypts the encrypted records and encrypted queries. The trusted machine processes the query using semantically secure query operators to produce a query result. The trusted machine ensures the size of the query result conforms to an upper bound on the number or records in the query result and returns the query result.

20 Claims, 5 Drawing Sheets

(56) References Cited

U.S. PATENT DOCUMENTS

| | | | |
|---|---|---|---|
| 9,152,815 B2* | 10/2015 | Baentsch | ............ G06F 21/6218 |
| 9,336,217 B2* | 5/2016 | Kruglick | |
| 2004/0181679 A1 | 9/2004 | Dettinger et al. | |
| 2005/0071337 A1 | 3/2005 | Baranczyk et al. | |
| 2008/0133935 A1 | 6/2008 | Elovici et al. | |
| 2013/0191650 A1 | 7/2013 | Balakrishnan et al. | |
| 2014/0164758 A1 | 6/2014 | Ramamurthy et al. | |
| 2014/0281511 A1 | 9/2014 | Kaushik et al. | |
| 2014/0281512 A1 | 9/2014 | Arasu et al. | |

OTHER PUBLICATIONS

Arasu et al., "Oblivious Query Processing", In Proceedings of International Conference on Database Theory, Mar. 24, 2014, 15 pages.
Arasu et al., "Orthogonal Security with Cipherbase", In Proceedings of 6th Biennial Conference on Innovative Data Systems Research, Jan. 6, 2013, 10 pages.
Arasu et al., "Querying Encrypted Data", In Proceedings of the ACM SIGMOD international conference on Management of data, Jun. 18, 2014, 3 pages.
Arasu et al., "When is an Encrypted Database Secure?", In Technical report MSR-TR-2014-133, Sep. 1, 2014, 1 page.
Bajaj et al., "TrustedDB: A Trusted Hardware Based Database with Privacy and Data Confidentiality", In Proceedings of ACM SIGMOD International Conference on Management of Data, Jun. 12, 2011, 12 pages.
Baumann et al., "Shielding Applications from an Untrusted Cloud with Haven", In Proceedings of the 11th USENIX Symposium on Operating Systems Design and Implementation, Oct. 6, 2014, 19 pages.
Chen et al., "Privacy-Preserving Data Publishing", Jan. 2009, In Journal of Foundations and Trends in Databases, vol. 2(1-2), Jan. 2009, 1 page.
Cheung, "Security on Cloud Computing, Query Computation and Data Mining on Encrypted Database", In Proceedings of IEEE Technology Time Machine Symposium on Technologies Beyond 2020, Jun. 1, 2011, 1 page.
"Database as Service," Retrieved on: Nov. 14, 2014, Available at: http://www-db.ics.uci.edu/pages/research/das/index.shtml, 5 pages.
Dean et al., "MapReduce: Simplified Data Processing on Large Clusters", In Communications of the ACM, vol. 51 (1), Jan. 2008, 7 pages.
Dinur et al., "Revealing Information While Preserving Privacy," In Proceedings of the twenty-second ACM SIGMOD-SIGACT-SIGART symposium on Principles of database systems, Jun. 9, 2013, 9 pages.
Dwork, C., "Differential Privacy", In Proceedings of 33rd International Colloquium on Automata, Languages and Programming, Jul. 10, 2006, 12 pages.
Gentry, C., "Computing Arbitrary Functions of Encrypted Data", In Communications of the ACM, vol. 53, Issue 3, Mar. 2010, 9 pages.
Goldreich et al., "Software Protection and Simulation on Oblivious RAMs", In Journal of the ACM, vol. 43(3), May 1996, 43 pages.
Goodrich et al., "Data-Oblivious External-Memory Algorithms for the Compaction, Selection, and Sorting of Outsourced Data", In Proceedings of the twenty-third annual ACM symposium on Parallelism in algorithms and architectures, Jun. 4, 2011, 26 pages.
Gray, "What next? A dozen information-Technology Research Goals," In Technical Report Ms-TR-99-50, Microsoft Research, Jun. 1999, 25 pages.
Halderman et al., "Lest We Remember: Cold-Boot Attacks on Encryption Keys", In Communications of the ACM, vol. 52, Issue 5, May 2009, 16 pages.
Hore et al., "Managing and Querying Encrypted Data," In Handbook of Database Security, 2008, pp. 163-190, 7 pages.
Kantarcioglu et al., "Security Issues in Querying Encrypted Data," In Proceedings of the 19th annual IFIP WG 11.3 working conference on Data and Applications Security, Aug. 7, 2005, 13 pages.
Katz et al., "Introduction to Modern Cryptography," In CRC Press, Aug. 31, 2007, 20 pages.
Li et al., "Privacy Preserving Joins," In Proceedings of IEEE 24th International Conference on Data Engineering, Apr. 7, 2008, 3 pages.
Maas et al., "PHANTOM Practical Oblivious Computation in a Secure Processor," In Proceedings of the ACM SIGSAC conference on Computer & communications security, Nov. 4, 2013, 14 pages.
Miltersen, "Cell Probe Complexity—A Survey," In Proceedings of 19th Conference on the Foundations of Software Technology and Theoretical Computer Science, Dec. 13, 1999, 25 pages.
"National Vulnerability Database," Retrieved on: Nov. 14, 2014, Available at: http://web.nvd.nist.gov/view/vuln/statistics, 2 pages.
Olumofin et al., "Privacy-preserving Queries over Relational Databases", In Proceedings of the 10th International Conference on Privacy Enhancing Technologies, Jul. 21, 2010, 18 pages.
Popa et al., "CryptDB: Protecting Confidentiality with Encrypted Query Processing," In Proceedings of the Twenty-Third ACM Symposium on Operating Systems Principles, Oct. 23, 2011, 16 pages.
"Privacy Rights Clearinghouse", In Proceedings of Chronology of Data Breaches, Apr. 20, 2005, 12 pages.
"Transaction Processing Performance Council," Retrieved on: Nov. 14, 2014, Available at: http://www.tpc.org, 1 page.
Tu et al, "Processing Analytical Queries over Encrypted Data," In Proceedings of the VLDB Endowment, vol. 6, Issue 5, Mar. 2013, 12 pages.
Wang et al., "Secure and Ef?cient Range Queries on Outsourced Databases Using R-trees", In Proceedings of 29th IEEE International Conference on Data Engineering, Apr. 8, 2013, 12 pages.
Wyseur, "RE-TRUST: Trustworthy Execution of SW on Remote Untrusted Platforms", In Proceedings of 32nd International Spring Seminar on Electronics Technology, May 13, 2009, 11 pages.
Xian et al., "A Query Conversion Scheme for Encrypted Cloud Databases", In Proceedings of International Conference on Information Technology and Applications, Nov. 16, 2013, 4 pages.
Jarecki, Stanislaw et al., "Outsourced symmetric private information retrieval", Computer & Communications Security, ACM, 2 Penn Plaza, Suite 701 NY, NY, Nov. 4, 2013, 14 pages.
PCT Search Report for corresponding PCT Application No. PCT/US2016/026283 dated Jun. 16, 2016, 13 pages.
"Second Written Opinion Issued in PCT Application No. PCT/US2016/026283", dated Mar. 1, 2017, 7 Pages.
"International Preliminary Report on Patentability Issued in PCT Application No. PCT/US2016/026283", dated May 23, 2017, 7 Pages.

* cited by examiner

CUSTOMIZED TRUSTED COMPUTER FOR SECURE DATA PROCESSING AND STORAGE

BACKGROUND

Databases are an integral component to applications that manage business and personal data. Application designers offload much of the storage, retrieval, and manipulation of large sets of data to databases. As the volume of data used by various applications has grown, so has the tendency to store that data on databases in remote locations, for retrieval across a network when needed.

There is a need to protect the privacy and confidentiality of data that is stored on the cloud or on machines in other remotely located networks. Encrypted database management systems (EDBMS) utilize encrypted data so that an adversary capable of viewing the transmitted or stored data is not able to interpret or otherwise access the plaintext content of the data.

SUMMARY

The techniques discussed herein facilitate transmission, storage, and manipulation of data in a semantically secure encrypted database management system (EDBMS). In at least one example, a query having encrypted contents is received at an untrusted machine of an EDBMS. The contents of the query can be decrypted on a trusted machine and query processing can be performed on the trusted machine by semantically secure query operators. An upper bound can be enforced on the number of records in the query result. The query result can be encrypted on the trusted machine and returned to the requestor.

The techniques discussed herein can provide for an EDBMS containing a data store having encrypted records, a trusted machine, and an untrusted machine connected to the data store and the trusted machine. The trusted machine can contain a query processor that receives encrypted queries and records and returns a query result. The trusted machine can also have a cryptography module for encrypting and decrypting the records and queries, and semantically secure query operators to process the query and produce a query result. The query result can conform to an upper bound on the number of encrypted records in the result.

This summary is provided to introduce a selection of concepts in a simplified form that are further described blow in the detailed description. This summary is not intended to identify key features or essential features of the claimed subject matter, nor is it intended that this summary be used to limit the scope of the claimed subject matter. Furthermore, the claimed subject matter is not limited to examples that solve any or all disadvantages noted in any part of this disclosure.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
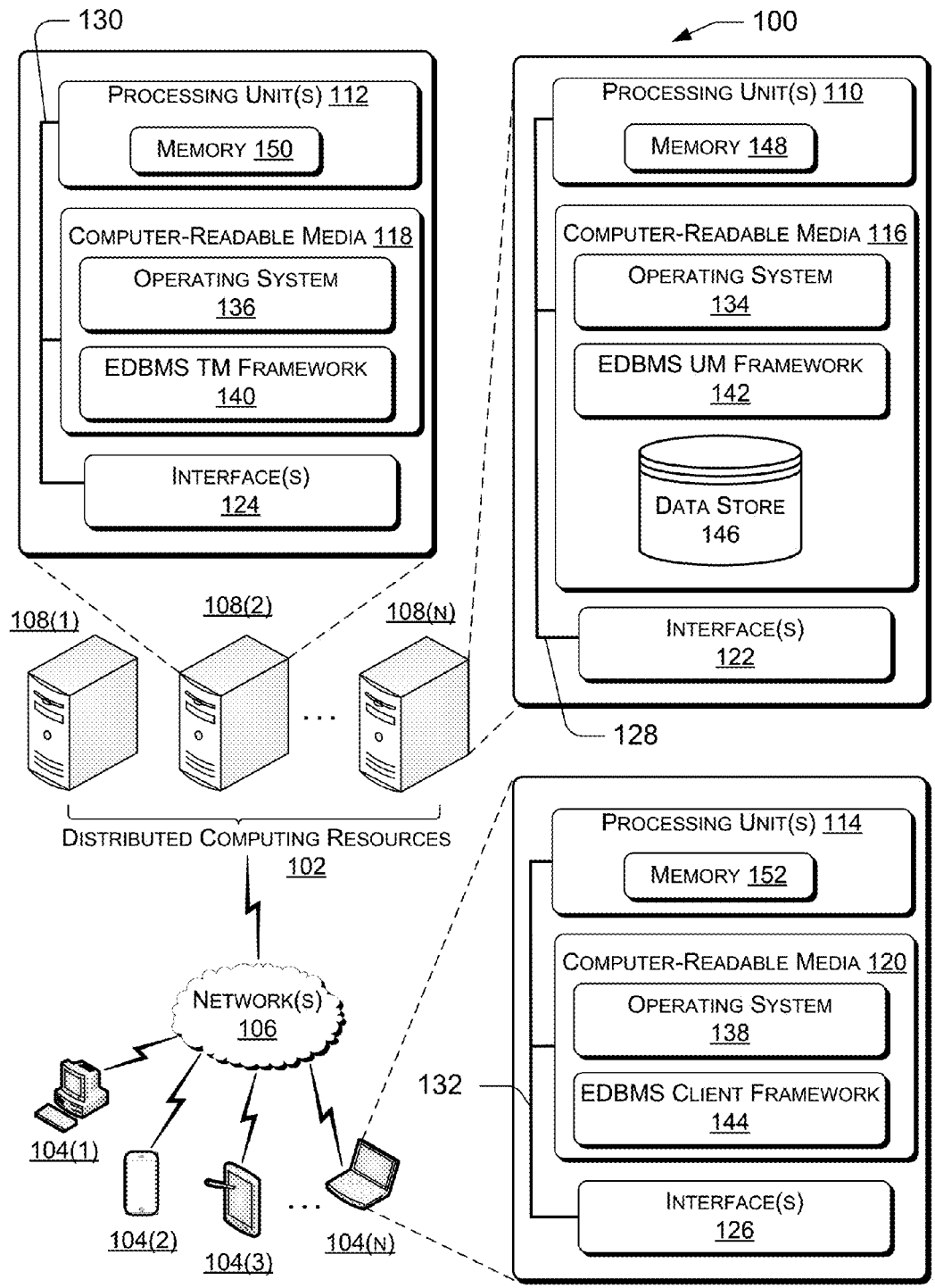
FIG. 1 is a block diagram depicting an example environment in which an example semantically secure encrypted database management system (EDBMS) can operate according to some examples.

This disclosure is directed to processing queries in a semantically secure encrypted database management system (EDBMS) so that the cardinality of a query result is functionally independent of any query parameters. The techniques and systems described herein can allow for increased security by reducing the likelihood that an adversary can reconstruct the plaintext content of the data store used by the EDBMS.

In a conventional EDBMS, the EDBMS contains an untrusted server machine connected to a data store. The untrusted machine receives queries from client applications, retrieves encrypted records from an encrypted data store, and sends the queries and encrypted records to a trusted machine. The trusted machine decrypts the records and performs operations on the decrypted data in a trusted environment.

If an EDBMS is server-centric, meaning the queries are processed in the server without shipping all the data to the client, encryption does not automatically translate to data confidentiality. Correlations between the query parameter and the query result can be used to recreate the entire plaintext content of the encrypted data in the EDBMS. An EDBMS that permits such re-creation of the entire plaintext content of the EDBMS can be said to permit full disclosure. An EDBMS can be said to permit full disclosure if running queries against the EDBMS allows an adversary to systematically reconstruct most database instances (i.e., recover the full plaintext).

As an example of an adversary with the ability to achieve full disclosure by monitoring certain interactions in an EDBMS, an eavesdropping system administrator, henceforth called EveSys, will now be described. EveSys has root access to the server, and has unbounded observational power over the untrusted machine in the EDBMS and over the untrusted machine's communications. EveSys is a passive adversary and does not tamper with the server in any way. The information available to EveSys from the interface of the EDBMS is the encrypted data store, and for every query, the encrypted query and encrypted result. EveSys has knowledge of the database schema, specifically table names, column names, and relationships between keys and foreign keys in the table (key-foreign-key constraints). For every query, EveSys has knowledge of the query template (i.e., all of the SQL query except the constants).

During query execution, the internals of the distributed database system reveals to EveSys the query trace. The trace of a query Q over database D, denoted Tr(Q, D) includes all events happening inside the untrusted machine, including: the sequence of instructions executed, the sequence of memory accesses (in every core, and at every level of the memory hierarchy including disk), and all communication to and from the untrusted machine with both the trusted machine and the client. EveSys is a (randomized) polynomial time algorithm with the following inputs: the query template, the encrypted database, and the query trace (the encrypted query result is included in the query trace as defined).

TABLE 1

SELECT * FROM R
WHERE EXISTS (SELECT * FROM R
WHERE Dim = @1 AND Value = 0)

To describe how a passive adversary can achieve full disclosure, the process is first described for an active adversary. A class of data store instances D encodes an n-dimensional binary vector. As an example, consider a string of binary digits having an arbitrary length equal to n digits. Each binary digit can be encoded as either a 0 or a 1. If n=8, a sample string would resemble the form "01001011." The binary string is stored in a data store having one table R. The table R(Dim, Value) has n records, one record for each of the n digits of the binary string. The records have the form <1, v[i]> where i∈[1, n] and v[i] is the value of the record that corresponds to dimension i. There are $2^N$ possible data stores that can satisfy the above definition of a data store containing the table R. However, by running n queries of the form illustrated in Table 1, where @i=[1, n], an active adversary can recreate the entire plaintext content of the data store. For each value of i, the query returns an empty set if v[i]=1 and returns the full table R if v[i]=0. If, based on the size of the communicated result, the adversary can distinguish outcomes where the full table R is returned from outcomes where the empty set is returned, the adversary can determine values for the full vector v. A server-centric EDBMS communicates the results of a query execution to a client using at most (m+1) $f(n)$ bits, for a function $f$ that is $o(n^\delta)$ for some constant $0 \le \delta < 1$. The communication efficiency of a server-centric EDBMS implies that the empty output (v[i]=1) is communicated using at most $f(n)$ bits. It can be shown that almost all instances of the data store need more than $f(n)$ bits (the number of instances that can be represented in $f(n)$ bits is at most $2^{f(n)}$; the fraction $(2^{f(n)}/2^n)$ is negligible when $f(n)$ is $O(n^\delta)$, for some constant $0 \le \delta < 1$. Hence, by examining whether the output size is $\le f(n)$ or $> f(n)$, the adversary can reconstruct almost all instances.

The process described above, by which an active adversary can reconstruct a data store by posing queries and observing the encrypted outcome, can be modified for a passive adversary, such as EveSys. By setting the workload, $\mathcal{Q}$, of queries that are available to be used in the EDBMS to be the same as the above set of queries used in the active attack, a passive adversary learns the full plaintext content of the data store as well, since each query in Q is sampled at least once with high probability if we take $t=|\mathcal{Q}| \log |\mathcal{Q}|$ samples.

TABLE 2

EXISTS
(SELECT         * FROM R AS R1
WHERE          (SELECT COUNT (*)
LSB(@Dim) = 0 AND
  (SELECT COUNT(*)
  FROM R AS R2

TABLE 2-continued

WHERE R2.Dim < R1.Dim)
=
(SELECT COUNT(*)
FROM R AS R3
WHERE R3.Dim >= R1.Dim AND
                R3.Dim < @Dim))

TABLE 3

SELECT        Dim FROM R AS R1
WHERE         (LSB(@Dim) = 0 AND
(SELECT COUNT(*)
FROM R AS R2
WHERE R2.Dim <= r1.Dim)
=
(SELECT COUNT(*)
FROM R AS R3
WHERE R2.Dim > R1.Dim AND
                R2.Dim <= @Dim))
OR
(LSB(@Dim) = 1 AND
(SELECT COUNT(*))
FROM R AS R4
WHERE R4.Dim <= R1.Dim)
=
(SELECT COUNT(*)
FROM R AS R5
WHERE R5.Dim > R1.Dim AND
                R5.Dim < @Dim))

Additionally, the two constants used in the queries of Table 1 above can be eliminated without changing the query semantics. The constant 0 can be specified using the expression SELECT MIN(Value) FROM R. Although generally successful, this approach will not work for the instance corresponding to a vector made up solely of 0s. Table 2 illustrates a SQL expression to check the least significant bit (LSB) of a value. It checks whether a value @Dim is odd (LSB=1) by finding if there is a mid-point @Mid between 1 and @Dim, with an equal number of values in the ranges [1, @Mid) and [@Mid, @Dim). Table 3 illustrates the SQL expression to perform division by 2, which also seeks a similar mid-point. The above expressions can be combined to check whether Dim=i.

As demonstrated above, a server-centric EDBMS can permit full disclosure because of information revealed during query execution. A higher level of security for an EDBMS can be described as non-full-disclosure. Non-full-disclosure can refer to an EDBMS that allows an adversary to discern less than the full plaintext content of the system. However, non-full-disclosure still allows for information to be revealed that permits an adversary to recreate large portions of the plaintext of the data store as long as at least one bit of the encrypted data remains indecipherable.

A semantically secure EDBMS represents a still higher level of security that utilizes semantic security. Semantic security describes a class of encryption schemes that provide a particular level of security against an adversary. The adversary may be an algorithm that runs in polynomial time and is designed to create two distinct plaintext messages of equal length. An encryption scheme can be used to encrypt the plaintext data resulting in a ciphertext. If, after inspecting the ciphertext, the adversary is unable to reliably determine which of the two original plaintext messages was used to create the ciphertext, the encryption scheme can be referred to as being semantically secure. A ciphertext that has been created by a semantically secure encryption scheme provides no information that can be used by the adversary in determining the original plaintext content. A semantically secure EDBMS may refer to an EDBMS where the result of a query exposes no information that can be used by an adversary to determine the query parameter(s) used to derive the query result.

The techniques and systems described herein can be implemented in a number of ways to process queries in a semantically secure EDBMS. Examples are provided below with reference to the following figures. The examples and illustrations described herein can be combined.

Illustrative Environment

FIG. 1, is a block diagram that depicts an example environment 100 in which a semantically secure EDBMS can operate. In some examples, the various devices and/or components of environment 100 include distributed computing resources 102 that can communicate with one another and with external computing resources 104 via one or more networks 106.

For example, network(s) 106 can include public networks such as the Internet, private networks such as an institutional and/or personal intranet, or some combination of private and public networks. Network(s) 106 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 106 can utilize communications protocols, including packet-based and/or datagram-based protocols such as internet protocol (IP), transmission control protocol (TCP), user datagram protocol (UDP), or other types of protocols. Moreover, network(s) 106 can also include a number of devices that facilitate network communications and/or form a hardware basis for the networks, such as switches, routers, gateways, access points, firewalls, base stations, repeaters, backbone devices, and the like.

In some examples, network(s) 106 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 1302.11 standards (e.g., 1302.11g, 1302.11n, and so forth), and other standards.

In various examples, distributed computing resources 102 include devices such as computing devices 108(1)-108(n). Examples support scenarios where computing devices 108 can include one or more computing devices that operate in a cluster or other grouped configuration to share resources, balance load, increase performance, provide fail-over support or redundancy, or for other purposes. Although illustrated as desktop computers, computing devices 108 can include a diverse variety of device types and are not limited to any particular type of device. For example, instead of individual machines as illustrated, in some examples, computing devices can be individual processor or clusters of processors operating within a single machine. Computing devices 108 can include client devices 104.

Computing devices 108 and client devices 104 can include any type of computing device having one or more processing unit(s) 110, 112, 114 operably connected to computer-readable media 116, 118, or 120 and to one or more interfaces(s) 122, 124, or 126. The connection can be via a bus 128, 130, or 132, which in some instances can include one or more of a system bus, a data bus, an address bus, a PCI bus, a Mini-PCI bus, and any variety of local, peripheral, and/or independent buses, or via another operable connection.

Devices such as computing devices 108 and client devices 104 can include, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device. In some instances, computing devices 108 may operate in a server environment while client devices 104 may operate in the possession of a customer or customers.

Interface(s) 122, 124, and 126 can include I/O interface(s), that allow devices 104 and 108 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). Interfaces 122, 124, and 126 can include network interfaces. Network interfaces can enable communications between a computing device 104 or 108 and other networked devices such as other devices 104 or 108 over networks 106. Such network interface(s) can include one or more network interface controllers (NICs) or other types of transceiver devices to send and receive communications over a network.

The computer-readable media 116, 118, and 120 can include, at least, two types of computer-readable media, namely computer storage media and communication media. Computer storage media can include volatile and non-volatile machine-readable, removable, and non-removable media implemented in any method or technology for storage of information (in compressed or uncompressed form), such as computer (or other electronic device) readable instructions, data structures, program modules, or other data to perform processes or methods described herein. Computer storage media includes, but is not limited to hard drives, floppy diskettes, optical disks, read-only memories (ROMs), CD-ROMs, DVDs, random access memories (RAMs), EPROMs, EEPROMs, flash memory, magnetic or optical cards, solid-state memory devices, or other types of hardware media suitable for storing electronic instructions.

In contrast, communication media can embody computer-readable instructions, data structures, program modules, or other data in a modulated data signal, such as a carrier wave, or other transmission mechanism. As defined herein, computer storage media does not include communication media.

In at least one example, the computer-readable media 116, 118, and 120 can store instructions executable by the processing unit(s) 110, 112, and 114, which can represent one or more central processing units (CPUs, or CPU in the singular) incorporated in device 104 or 108. Executable instructions can include, for example, an operating system 134, 136, 138, various frameworks, and other modules, programs, or applications that can be loadable and executable by the processing unit(s) 110, 112, 114. In some examples, multiple frameworks, such as an EDBMS trusted machine (EDBMS TM) framework 140 and an EDBMS untrusted machine (EDBMS UM) framework 142, can execute on a single machine and can be stored on one or more computer-readable media such as computer-readable media 116, 118, and 120. In other examples, frameworks can be stored on separate computer-readable media and can execute on separate machines. For example, the computer-readable media 118 can store an EDBMS TM framework 140, computer-readable media 116 can store an EDBMS UM framework 142, and computer-readable media 120 can store an EDBMS client framework 144. The computer-readable media 116, 118, and 120 can include one or more data stores. For example, the computer-readable media 116 can store data store 146. Alternatively, some or all of the above-referenced data and/or instructions may be stored on separate memories 148, 150, 152 on board a processor 110, 112, 114.

Figure 2:
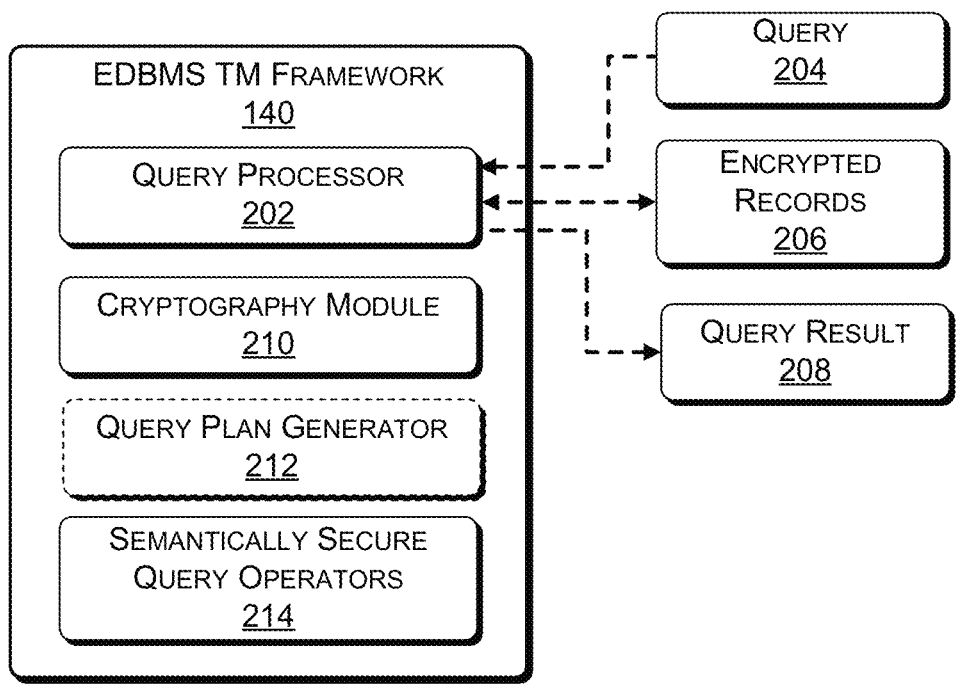
FIG. 2 is a block diagram of components of an illustrative semantically secure EDBMS TM framework that can be implemented by a computing device according to various examples.

FIG. 2 is a block diagram of components of an illustrative EDBMS TM framework 140 that can be stored on a trusted machine such as computing device 108. In at least one example, an EDBMS TM framework 140 can contain a query processor 202 configured for receiving a query 204 having encrypted contents and one or more encrypted records 206 from a data store 146. The query processor 202 can coordinate the execution of the query 204 on a trusted machine and can return a query result 208. In some instances, the query 204 received by the query processor 202 is a complete query, while in others, it can be an intermediate query. An intermediate query can be one of several query operations needed to process a complete query according to a query plan. When the query processor 202 coordinates the execution of an intermediate query, the query result 208 that is returned can be an intermediate query result.

According to some examples, the query processor 202 utilizes a cryptography module 210 to decrypt the encrypted records 206 and the query 204 having encrypted contents. The cryptography module 210 can also be used to encrypt a query result 208. The cryptography module 210 can employ an encryption scheme where the encryption and decryption functions share the same encryption key. The cryptography module 210 can utilize an encryption function that is non-deterministic, takes an encryption key and a ciphertext as input, and returns plaintext as output. The cryptography module 210 can utilize a decryption function that is deterministic, takes an encryption key and a ciphertext as input, and returns plaintext as output.

For encrypted records 206, the data can be encrypted at the record level, or on a cell-by-cell basis using encryption keys that are specific to each column of the data store 146. The records can be encrypted using a semantically secure encryption scheme that is non-deterministic and that encrypts duplicate values differently. In an instance, the cryptography module 210 can employ the advanced encryption standard (AES) in cipher block chaining (CBC) mode to encrypt records on a cell-by-cell basis using keys that are specific to each column of the data store 146. Table 4 and Table 5 illustrate an example of a health care database having a single "Ailment" table. The records of the encrypted Ailment table simulate records that have been encrypted in a cell-by-cell manner using a semantically secure encryption scheme. The encrypted Ailment table illustrates that the same value, "AIDS," is encrypted differently in different records by the semantically secure encryption scheme.

TABLE 5

Ailment (Encrypted)

| Name | Disease |
|------|---------|
| %@# | !@#$xyz |
| +−(0 | @% abc |
| &*!@ | *&#pqr |
| e*( | (p#z~94 |

TABLE 4

Ailment (Original)

| Name | Disease |
|------|---------|
| Alice | AIDS |
| Bob | Flu |
| Chen | AIDS |
| Dana | Diabetes |

The query processor 202 can utilize the cryptography module 210 to decrypt a query 204 having encrypted contents. In some instances, the entire query 204 can be encrypted, while in other instances, only part of the query, such as the query parameters may be encrypted.

The query plan generator 212 can take a query 204 and break the query 204 down into a query plan having intermediate queries or query operations. In various examples, the query plan generator 212 is optional because the query plan is generated elsewhere and passed with the query 204 to the query processor 202. In some examples, when the query plan is generated elsewhere, the query 204 received by the query processor 202 can be an intermediate query.

After the encrypted records 206 and the encrypted query contents have been decrypted, the query processor 202 can process the query 204 by utilizing semantically secure query operators 214. A semantically secure query operator 214 can be used to execute an associated query operation on decrypted data derived from the encrypted records 206. In some examples, semantically secure query operators 214 remove information that can be used to identify correlations between a query parameter and a query result 208.

According to various instances, a semantically secure query operator 214 represents a standard query operator that reveals no information to the adversary other than the sizes of the inputs to the query operator. In particular, a semantically secure query operator 214 does not reveal an output size of the associated query operation if the output size is based, at least in part, on a query parameter. Queries that are executed using semantically secure query operators 214 also reveal no information to the adversary other than the sizes of the inputs to the query. Accordingly, a semantically secure EDBMS that executes queries by using semantically secure query operators 214 will also be semantically secure.

In the examples above that were used to demonstrate full disclosure, the sizes of the outputs of queries were used to determine the plaintext content of the data store. A semantically secure query operator 214 can mask the output size, or cardinality, of a query operation. The EDBMS client framework 144 can predefine an upper bound, k, on the size of any query result 208 at the time the semantically secure EDBMS is defined. If the size of a query result 208 for a query Q over database D is less than k, the query result 208 is returned to the client with suitable padding to hide the actual result size. The query result 208 can be padded with dummy records, which are records that are not part of the actual query result 208, but that are added to the query result 208 to increase the cardinality of the query result 208. If the size of a query result 208 is greater than k, the semantically secure query operator 214 arbitrarily truncates the query result 208 to k tuples. In this way, the semantically secure EDBMS remains server-centric, but the query result size is not revealed. When the size of a query result 208 equals the upper bound, k, no padding or truncating is needed.

In various examples, semantically secure query operators 214 are scan-based. Rather than employing auxiliary structures, such as indexes, to locate and manipulate records, a scan-based semantically secure query operator 214 can scan each record of the input. In this way, the pattern of memory accesses used by the semantically secure query operator 214 reveals no useful information to an adversary capable of observing the memory accesses on the data store 146. A query plan that uses semantically secure query operators 214 to perform query operations can be referred to as a scan-based query plan.

In some examples, the semantically secure query operators 214 support query operations in the Transaction Processing Performance Council Benchmark H (TPC-H) including filtering, sorting, foreign-key joins, and group-by aggregation. Semantically secure query operators 214 are composable, meaning a query plan composed of semantically secure query operators 214 would also be semantically secure. Likewise, the semantic security of a single query execution implies the semantic security of executing a set of queries. Examples of semantically secure query operators 214 will now be described.

In the following description of semantically secure query operators 214, if r denotes a record, then $\bar{r}$ denotes the encryption of r. A semantically secure sort operator 214 sorts an input stream of records based on some binary comparison function defined over the records. The sort predicate is modified so that all dummy records in the input sort to the end. In some instances, the semantically secure sort operation uses an external memory oblivious sorting algorithm, such as a bubble sort. With an external memory oblivious algorithm, the sequence of memory locations accessed during compositions of the sort operation, a merge-sort for example, reveals no information about its input such as the permutation of the input sequence.

In at least one instance, a semantically secure filter operator 214 is implemented by tagging a bit for every input record that indicates whether the record satisfies the filter predicate. Subsequent semantically secure query operators 214 treat records not satisfying the filter predicate as dummy records.

According to various examples, a semantically secure join operator 214 joins two input tables into one resulting table. In a standard sort-merge and hash join operation, the sort operation is insecure because the sequence of memory locations accessed by merge-sort reveals information about its input, such as the permutation of the input sequence. The standard hash join operation is also insecure because it reveals the join graph (for each record in the probe side, how many records it joins with in the build side).

TABLE 6

Algorithm 1 Oblivious foreign key join of R = $\bar{r}_1, \ldots, \bar{r}_n$ and S = $\bar{s}_1, \ldots, \bar{s}_n$ on attribute A.

```
1:    procedure SECUREJOIN(R, S, A)
2:       𝒰 ← φ        ▷ Intermediate union stream
3:       for all r̄ᵢ in R do
4:          Append ⟨r̄ᵢ,0⟩ to 𝒰
5:       endfor
6:       for all s̄₁ in S do
7:          Append ⟨s̄ᵢ,1⟩ to 𝒰
8:       endfor
9:       Secure sort 𝒰 on (A,Id) with all dummy records in R and S appearing at the end
10:      𝒥_d ← φ       ▷ Intermediate join stream
11:      lastR ← null
12:      for all ū in 𝒰 do
13:         if record is dummy then
14:            Append it to the output
15:         endif
16:         if ū = (r,0) then
17:            lastR ← r; Append ⟨dummyR⟩ to 𝒥_d
18:         else     ▷ Assert: ū = (s,1)
19:            if lastR[A] = s[A] then
20:               Append ⟨r,s⟩ to 𝒥_d
21:            else
22:               Append ⟨dummyS⟩ to 𝒥_d
23:            end if
24:         end if
25:      end for
26:      Output 𝒥_d with all ⟨dummyR⟩ removed via an oblivious sort where
         ⟨dummyR⟩ sort last and returning the prefix of size |S|
27:   end procedure
```

An algorithm for a semantically secure join operator between tables R and S according to some examples is illustrated in Table 6. R is the table with the key. Steps 2-8 compute a standard union. For each tuple, the table from which it came is remembered using column Id. Bit 0 corresponds to R tuples and a bit 1 to S. If R and S tuples have different lengths, we use padding to ensure tuples in 𝒰 have the same length. Next, 𝒰 is securely sorted on ⟨A, Id⟩ (Step 9). Using Id in the sort attribute list ensures that if an R tuple and an S tuple agree on their A values, the (unique) R tuple occurs first in the sort ordering. The merge step is implemented by iterating over the tuples in 𝒰. Any S tuple ⟨s, 1⟩ in $\mathcal{U}$ joins with the most recent R tuple in $\mathcal{U}$ (stored in lastR) or does not join with any R tuple. This property is used to generate ⟨r, s⟩ tuples in the join output (Step 20). To hide access patterns, dummy output tuples are produced when an R tuple (Step 17) or an S tuple is read that does not produce a join output (Step 22). The dummy tuples corresponding to tuples from R are removed using a secure filter (Step 26). In this way, the output size is established as the size of S.

The input and output patterns of memory accesses for the union, secure sort, and the merge steps do not depend on data values in R and S. Further, encryption ensures that at the end of the sort step, the adversary cannot find the correspondence between tuples in $\mathcal{U}$ and the input tuples in R and S. The security of the semantically secure join operator 214 is obtained from combining both observations. The algorithm does not require every record in S to join with at least one record in R. Some records of S may well not participate in the join. However, if any record of S does participate, it joins with one record in R. Overall, the secure join has the same time and data complexity as a traditional sort-merge join.

Semantically secure query operators 214 can include a semantically secure anti-join operator 214. The algorithms for key-foreign key semantically secure anti-joins are variants of the foreign key semantically secure join presented above. Achieving a semantically secure anti-join operator 214 R⊲$_{kfk}$ S that returns all records of S that do not participate in a foreign-key join with R when R is the key side, requires a trivial modification to the algorithm in Table 6 where the records marked dummyS above are the actual output records and the non-dummy records are dummyS records.

The anti join R▷$_{kfk}$ S that returns all records of R that do not participate in a foreign-key join with S with R being the key side can also be handled with a small modification to the foreign-key algorithm presented in Table 6. The union of R and S is sorted, but the output of the merge step is "delayed" by one record. The output record corresponding to a given record is determined after reading the next record. A real output record is generated when the present record is a record from R and either there is no next record, or the next record is a different record from R or a record from S that does not join with the present record. Otherwise, dummyR and dummyS records are returned. As before, all dummyS records are removed to return an output of size |R|.

Semantically secure query operators 214 can include a semantically secure group by operator 214 and a semantically secure aggregation operator 214 for the special case of a single grouping attribute and COUNT(*) aggregate. The algorithm can be generalized to handle more general grouping and other standard aggregation functions including MIN, MAX, COUNT, AVG, SUM, and MEDIAN. The algorithm can also be adapted to provide a secure duplicate elimination operator.

TABLE 7

Algorithm 2 Grouping and COUNT(*) aggregation of R = $\bar{r}_1, \ldots, \bar{r}_n$ with a single grouping attribute A.

1:  procedure SECUREGROUPAGGR(R, A)
2:      $R_{sort}$ ← secure sort of R on A with all dummy records at the end
3:      curA ← null
4:      curCount ← 0
5:      $\mathcal{G}_t$ ← φ
6:      for all $\bar{r}$ in $R_{sort}$ do TABLE 7-continued Algorithm 2 Grouping and COUNT(*) aggregation of R = $\bar{r}_1, \ldots, \bar{r}_n$ with a single grouping attribute A.

7.          if record is dummy then
8.              Append it to the output
9.          end if
10.         if r[A] = curA then
11.             curCount ← curCount + 1
12.             Append ⟨$\overline{dummy}$⟩ to $\mathcal{G}_t$
13.         else
14.             Append ⟨$\overline{curA, curCount}$⟩ to $\mathcal{G}_t$
15.             curA ← r[A]
16.             curCount ← 0
17.         end if
18.     endfor
19.     Output $\mathcal{G}_t$ with ⟨dummy⟩ at the end (oblivious sort)
20. end procedure Table 7 illustrates an example of a semantically secure grouping and aggregation operation. Using a semantically secure sorting operation with traditional sort-based grouping and aggregation would still result in an insecure operation since the size of each group would be revealed. The Algorithm 2 presented in Table 7 begins by securely sorting input stream R on grouping attribute A (step 2). As in traditional aggregation, the sorted stream is scanned and the counts of each group are computed. The traditional aggregation produces one output tuple per group after the last input tuple belonging to the group has been processed (Step 14). Algorithm 2 contains a modification to the traditional method whereby dummy output tuples for the other input tuples of a group are produced as well (step 12). The dummy tuples are returned at the end via an oblivious sort (Step 19). The security of the operation follows since the input/output pattern of memory accesses for the query operator is independent of the contents of R, and the overall time and data complexity is the same as traditional group by aggregation.

In some examples, the root operator for all query plans created by the query plan generator is a special operator Output-k that filters away any dummy tuples introduced by downstream operators. Output-k produces exactly k tuples with suitable padding or truncation. Output-k obliviously sorts its input so that real records appear before dummy records. By producing exactly k tuples, the upper bound set by the client can be enforced.

Figure 3:
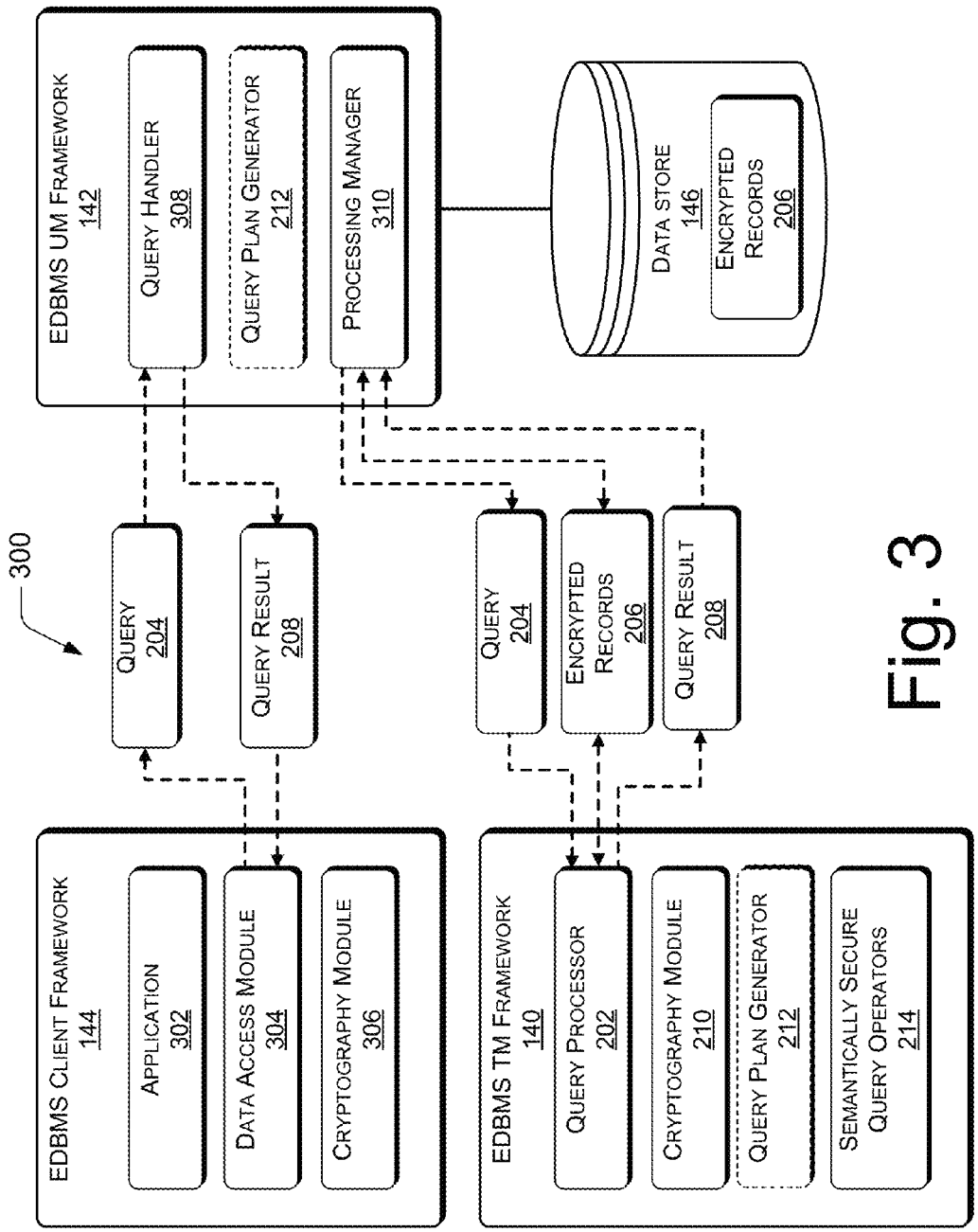
FIG. 3 is a block diagram of components in a semantically secure EDBMS according to some examples.

FIG. 3 is a block diagram of components in a semantically secure EDBMS. In some instances, the system includes an EDBMS client framework 144. The EDBMS client framework 144 can include one or more applications 302 needing access to data that is external to the application 302. A data access module 304 can provide the application 302 with access to the data by sending a request for the data in the form of a query 204 and receiving the data in the form of a query result 208.

The query 204 contains instructions for querying a data store 146. In some instances, the instructions are written in a language such as structured query language (SQL) or a variant of SQL. The query 204 can be structured to allow the application 302 to provide specific arguments for the instructions in the form of constants. The constants can be referred to as query parameters, and the instructions can be referred to as the query template.

In at least one example, the EDBMS client framework 144 includes a cryptography module 306 that encrypts and decrypts the query 204 and the query result 208. The entire query 204 can be encrypted, or, in some cases, only the query parameter can be encrypted.

In some examples, the EDBMS client framework 144 communicates with an EDBMS untrusted machine (EDBMS UM) framework 142. The EDBMS UM framework 142, in turn, communicates with a data store 146 and the EDBMS TM framework 140. The data access module 304 of the EDBMS client framework 144 sends a query 204 to a query handler 308 on the EDBMS UM framework 142 and receives a query result 208 from the query handler 308 in return.

In at least one instance, the EDBMS UM framework 142, the data store 146, and the EDBMS TM framework 140 form a distributed database. The EDBMS UM framework 142 coordinates activities and communications between the EDBMS TM framework 140, the data store 146 and the EDBMS client framework 144. The data store 146 provides storage for and access to sensitive data that is stored in an encrypted state. The EDBMS TM framework 140 is used to perform operations safely and securely on the data in an unencrypted state. Therefore, the EDBMS TM framework 140 is configured to run on trusted hardware, computing system 108(2) for example, where access to unauthorized individuals is restricted.

The EDBMS UM framework 142 can contain a query plan generator 212. The query plan generator 212 can create a query plan by breaking the query 204 down into smaller units of instructions and query operations. The smaller units of instructions may be referred to as intermediate queries. Although FIG. 3 depicts the query plan generator 212 as a component of the EDBMS UM framework 142, in some instances, the query plan generator 212 can reside on, or be accessible to, the EDBMS TM framework 140.

The query handler 308 can invoke a processing manager 310 to manage the transfer of data between the data store 146 and the EDBMS TM framework 140. According to various examples, the processing manager 310 retrieves encrypted records 206 from the data store 146 in accordance with the query template. The processing manager 310 sends the encrypted records 206 and the query 204 to the query processor 202 on the EDBMS TM framework 140. In some examples, the query 204 will be a complete query. In others, the query 204 can be an intermediate query containing instructions for one or more query operations according to query plan. The processing manager 310 receives a query result 208 from the query processor 202. The query result 208 can contain encrypted records 206, calculated values, error codes or other data. In some examples, when the query 204 is an intermediate query, the query result 208 can be an intermediate result.

In some instances, the processing manager 310 executes query instructions directly from within the EDBMS UM framework 142. For instance, a processing manager 310 can execute a union operation joining two tables. The union query operation is semantically secure because it uses no query parameters, and the cardinality of the output is determined by the cardinalities of the input tables.

Figure 4:
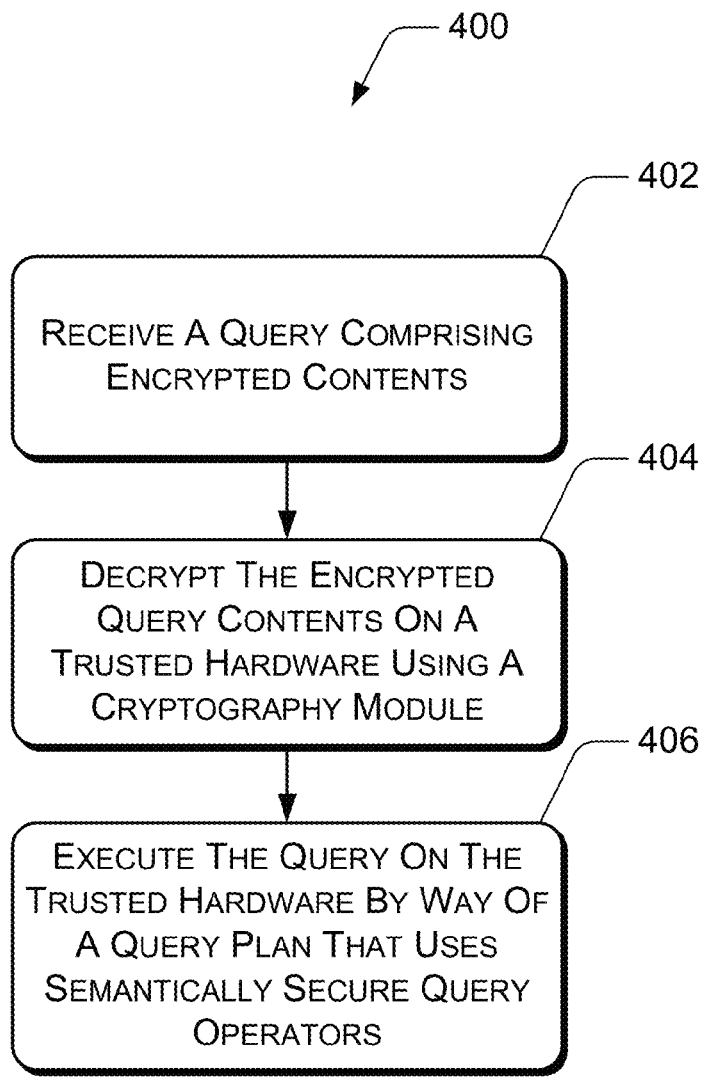
FIG. 4 is a flow diagram of an illustrative process for executing a query using semantically secure query operators according to some examples.
Figure 5:
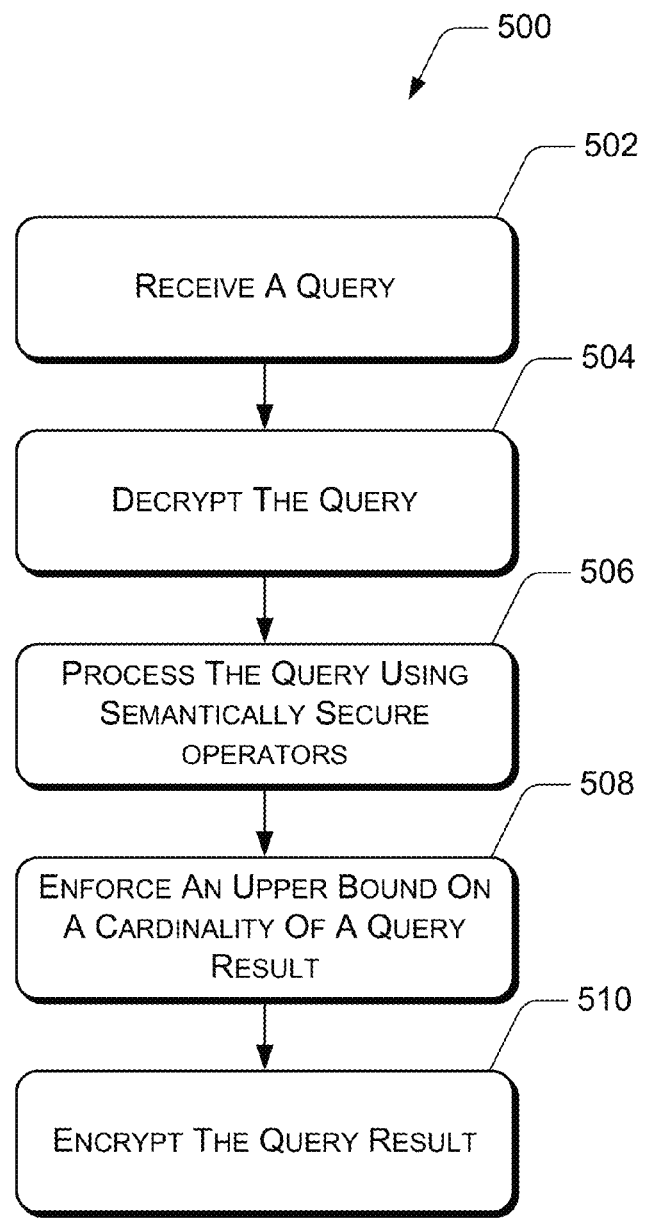
FIG. 5 is a flow diagram of an illustrative process for executing a query using semantically secure query operators according to some examples.

FIGS. 4 and 5 are flow diagrams of illustrative processes for secure data processing and storage. The processes are illustrated as a collection of blocks in logical flow graphs, which represent a sequence of operations that can be implemented in hardware, software, or a combination thereof. In the context of software, the blocks represent computer-executable instructions stored on one or more computer-readable storage media 116, 118, 120 or memory 148, 150, 152 that, when executed by one or more processors, perform the recited operations. Computer-executable instructions can include routines, programs, objects, components, data structures, and the like that perform particular functions or implement particular abstract data types. The order in which the operations are described is not intended to be construed as a limitation, and any number of the described blocks can be combined in any order and/or in parallel to implement the illustrated process. One or more of the processes described herein can occur independently or in relation in any order, whether in series or parallel.

FIG. 4 is a flow diagram of an illustrative process for executing a query 204 using semantically secure query operators 214. The process 400 is described with reference to the illustrative environment 100 and can be performed by a trusted machine such as computing device 108(2). Of course, the process 400 (and other processes described herein) can be performed in other environments and/or by other devices. These various environment and device examples are described as "a computing resource," which can include "a computing device."

In at least one example, at 402, a computing resource, such as computing device 108(2) receives a query 204 having encrypted contents. The query 204 can be received by a query processor 202 from an EDBMS UM framework 142 executing on a computer resource, such as computing device 108(n). The query 204 can be a complete query or an intermediate query. In some examples, one or more query parameters contained in the query 204 will be encrypted. In other examples, the entire query 204 will be encrypted. In at least one instance, the encrypted contents of the query 204 include a query plan.

At 404, the computing resource can decrypt the encrypted query contents on a trusted hardware using a cryptography module 210. In an example, the trusted hardware is computing device 108(2). The decrypted contents can contain one or more of a query plan, query parameters, and a query template.

At 406, the computing resource can execute the query 204 on the trusted hardware by way of a query plan 260 that uses semantically secure query operators 214. In some cases, the query plan is generated by a query plan generator 350 on or accessible to the trusted hardware. In other cases, the query plan generator 350 is on or accessible to a separate computing resource, such as computing device 108(n). The semantically secure query operators 214 utilized by the query processor 110 can include operations for sorting, filtering, joining, anti-joining, foreign key joining, foreign key anti-joining, grouping and aggregation, and performing unions. The query plan 260 executed by the computing resource can also include a root operator, Output-k, that conforms the query result to the number of records specified by the upper bound k. The Output-k operator can also sort the encrypted records in the query result so that real records appear before dummy records.

The execution of a query operation using a semantically secure query operator 214 can produce an output where the cardinality of the output is not discernible from a query trace of the query operation, because the cardinality, as viewed from a query trace, equals an upper bound. In some cases, one or more rows of the output of the query operation are truncated when the output size of the query operation is larger than the upper bound. In some examples, the cardinality of the output of a query operation associated with a semantically secure query operator 214 is set equal to an upper bound when the cardinality of the output is dependent, at least in part, on a query parameter for the associated query operation.

FIG. 5 is a flow diagram of an illustrative process for executing a query using semantically secure query operators 214. The process 500 is described with reference to the illustrative environment 100 and can be performed by various devices such as client device 104 and distributed computing resources 102 for example.

According to various examples, at 502, a semantically secure EDBMS receives a query 204. In at least one instance, the semantically secure EDBMS is a distributed database system having an EDBMS UM framework 142 communicating with a data store 146 and an EDBMS TM framework 140. In some instances, the EDBMS UM framework 142 and the EDBMS TM framework 140 execute on computing resources 108($n$) and 108(2) respectively. The query 204 can be sent from a data access module 304 executing within an EDBMS client framework 144 and received by a query handler 308 executing within the EDBMS UM framework 142. A processing manager 310 running on the EDBMS UM framework 142 can receive the query 204 back from the query handler 308, retrieve encrypted records 206 from the data store 146 according to instructions contained within the query 204, and send the encrypted records 206 and the query 204 to a query processor 202 executing on an EDBMS TM framework 140.

At 504, the query processor 202 can decrypt the query by utilizing a cryptography module 210. The cryptography module 210 can utilize a decryption function that is deterministic, takes a key and a ciphertext as input, and returns plaintext as output.

At 506, the query processor 202 can process the query 204 using semantically secure query operators 214. The query 204 can first be processed by a query plan generator 212. The query plan generator 212 can produce a query plan that details the individual operations, performed by semantically secure query operators 214 that are necessary to implement the query and can specify the order and or dependencies of the operations. Among the query operators, is an Output-k operator. The Output-k operator is a root operator that can enforce an upper bound on the number of records returned. The query plan can also ensure that each plan uses scan-based processing as opposed to using indices. The operators are semantically secure so that the cardinalities of intermediate and complete query results 280 conform to an upper bound, k.

EXAMPLE CLAUSES

A: An encrypted database management system (EDBMS) comprising: a data store configured to store one or more encrypted records; a trusted hardware configured to be connected to an untrusted hardware, wherein the trusted hardware includes a query processor configured to process a query by: receiving a query encrypted with an encryption scheme; receiving at least one record of the one or more encrypted records; and returning a query result having a cardinality that is less than or equal to an upper bound; a cryptography module configured to: decrypt the query; decrypt the encrypted records; and encrypt the query result; and one or more semantically secure query operators configured to perform associated query operations and produce the query result.

B: A system as paragraph A recites, wherein the untrusted hardware is further connected to the data store and includes: a query handler configured to receive the query; a query plan generator configured to generate a query plan for the query; and a processing manager configured to: retrieve the one or more encrypted records from the data store; and manage an execution of the query plan.

C: A system as any of paragraphs A-B recites, wherein the query processor is configured to truncate rows from the query result when the cardinality of the query result is larger than the upper bound.

D: A system as any of paragraphs A-C recites, wherein the query processor is configured to insert dummy records into the query result when the cardinality of the query result is less than the upper bound value.

E: A system as any of paragraphs A-D recites, wherein the query processor is configured to use at least one query operation associated with at least one of the one or more semantically secure query operators where a cardinality of an output of the at least one query operation is set equal to the upper bound when components determine the cardinality of the output of the at least one semantically secure operation is dependent, at least in part, on a query parameter.

F: A system as any of paragraphs A-E recites, wherein the EDBMS is a semantically secure EDBMS.

G: A method comprising: receiving a query, the query comprising encrypted contents; decrypting the encrypted contents of the query on a trusted hardware; processing the query on the trusted hardware using one or more semantically secure query operators; enforcing an upper bound on a cardinality of a query result; encrypting, on the trusted hardware, the query result; and sending the query result.

H: A method as paragraph G recites, wherein processing the query comprises processing the query using scan-based plans.

I: A method as any of paragraphs G-H recites, wherein processing the query further comprises at least one of the one or more semantically secure query operators performing an associated query operation in which a cardinality of an intermediate result of the associated query operation equals the upper bound.

J: A method as any of paragraphs G-I recites, wherein processing the query further comprises at least one of the one or more semantically secure query operators performing an associated query operation in which a cardinality of an output of the associated query operation equals the upper bound when the cardinality of the output is based, at least in part, on a query parameter for the associated operation.

K: A method as any of paragraphs G-J recites, wherein the one or more semantically secure query operators include at least one of a sort operator, filter operator, join operator, anti-join operator, group-by operator, aggregation operator, or union operator.

L: A method as any of paragraphs G-K recites, wherein enforcing the upper bound on the cardinality of the query result comprises truncating records from the query result when the cardinality exceeds the upper bound.

M: A method as any of paragraphs G-L recites, wherein enforcing the upper bound on the cardinality of the query result comprises padding the query result when the cardinality is less than the upper bound.

N: A method as any of paragraphs G-M recites, wherein the cryptography module uses one or more semantically secure encryption schemes.

O: A method as any of paragraphs G-N recites, wherein the EDBMS is a semantically secure EDBMS.

P: A computer-readable medium having computer-executable instructions thereon, the computer-executable instructions to configure a computer to perform a method as any of paragraphs G-O recites.

Q: A device comprising: a processor; a computer-readable medium having computer-executable instructions thereon to configure the processor to perform a method as any of paragraphs G-O recites.

R: One or more computer-readable storage media having computer-executable instructions that, when executed on one or more processors, configure one or more computers to perform operations comprising: receiving a query comprising encrypted contents; decrypting the encrypted contents of the query on a trusted hardware; and executing the query on the trusted hardware using one or more semantically secure query operators.

S: One or more computer-readable storage media as paragraph R recites, wherein an output size of a query operation associated with at least one of the one or more semantically secure query operators is not discernible.

T: One or more computer-readable storage media as any of paragraphs R-S recites, wherein one or more rows of an output of the operation are truncated when the output size of the operation is larger than an upper bound.

U: One or more computer-readable storage media as any of paragraphs R-T recites, wherein for individual ones of the one or more semantically secure query operators an output cardinality of an operation associated with the semantically secure query operator equals an upper bound if the output cardinality is based, at least in part, on a query parameter.

V: One or more computer-readable storage media as any of paragraphs R-U recites, wherein individual ones of the one or more semantically secure query operators utilize an external memory oblivious access pattern.

W: One or more computer-readable storage media as any of paragraphs R-V recites, wherein the one or more semantically secure query operators includes at least one of a group-by or aggregation operator.

X: One or more computer-readable storage media as any of paragraphs R-W recites, wherein the one or more semantically secure query operators includes an anti-join operator.

Y: One or more computer-readable media as any of paragraphs R-X recites, wherein the operations are semantically secure query operations.

CONCLUSION

Although the subject matter has been described in language specific to structural features and/or methodological acts, it is to be understood that the subject matter defined in the appended claims is not necessarily limited to the specific features or acts described. Rather, the specific features and steps are disclosed as example forms of implementing the claims.

All of the methods and processes described above can be embodied in, and fully automated via, software code modules executed by one or more general purpose computers or processors. The code modules can be stored in any type of computer-readable storage medium or other computer storage device. Some or all of the methods can alternatively be embodied in specialized computer hardware.

Conditional language such as, among others, "can," "could," or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate examples are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. An encrypted database management system (EDBMS) comprising:
    a data store configured to store one or more encrypted records;
    a trusted hardware configured to be connected to an untrusted hardware, wherein the trusted hardware includes a query processor configured to process a query by:
        receiving a query encrypted with an encryption scheme;
        receiving at least one record of the one or more encrypted records; and
        returning a query result having a cardinality that is less than or equal to an upper bound;
    a cryptography module configured to:
        decrypt the query;
        decrypt the encrypted records; and
        encrypt the query result; and
    one or more semantically secure query operators configured to perform associated query operations and produce the query result.

2. A system as claim 1 recites, wherein the untrusted hardware is further connected to the data store and includes:
    a query handler configured to receive the query;
    a query plan generator configured to generate a query plan for the query; and
    a processing manager configured to:
        retrieve the one or more encrypted records from the data store; and
        manage an execution of the query plan.

3. A system as claim 1 recites, wherein the query processor is configured to truncate rows from the query result when the cardinality of the query result is larger than the upper bound.

4. A system as claim 1 recites, wherein the query processor is configured to insert dummy records into the query result when the cardinality of the query result is less than the upper bound value.

5. A system as claim 1 recites, wherein the query processor is configured to use at least one query operation associated with at least one of the one or more semantically secure query operators where a cardinality of an output of the at least one query operation is set equal to the upper bound when it is determined that the cardinality of the output of the at least one semantically secure operation is dependent, at least in part, on a query parameter.

6. A system as claim 1 recites, wherein the one or more semantically secure query operators include at least one of a sort operator, filter operator, join operator, anti-join operator, group-by operator, aggregation operator, or union operator.

7. A method comprising:
receiving a query, the query comprising encrypted contents;
decrypting the encrypted contents of the query on a trusted hardware;
processing the query on the trusted hardware using one or more semantically secure query operators;
enforcing an upper bound on a cardinality of a query result;
encrypting, on the trusted hardware, the query result; and
sending the query result.

8. A method as claim 7 recites, wherein processing the query comprises processing the query using scan-based query plans.

9. A method as claim 7 recites, wherein processing the query further comprises at least one of the one or more semantically secure query operators performing an associated query operation in which a cardinality of an intermediate result of the associated query operation equals the upper bound.

10. A method as claim 7 recites, wherein processing the query further comprises at least one of the one or more semantically secure query operators performing an associated query operation in which a cardinality of an output of the associated query operation equals the upper bound when the cardinality of the output is based, at least in part, on a query parameter for the associated operation.

11. A method as claim 7 recites, wherein the one or more semantically secure query operators include at least one of a sort operator, filter operator, join operator, anti-join operator, group-by operator, aggregation operator, or union operator.

12. A method as claim 7 recites, wherein enforcing the upper bound on the cardinality of the query result comprises truncating records from the query result when the cardinality exceeds the upper bound.

13. A method as claim 7 recites, wherein enforcing the upper bound on the cardinality of the query result comprises padding the query result when the cardinality is less than the upper bound.

14. A method as claim 7 recites, wherein the cryptography module is configured to use one or more semantically secure encryption schemes.

15. One or more non-transitory computer-readable storage media having computer-executable instructions that, when executed on one or more processors, configure one or more computers to perform operations comprising:
receiving a query comprising encrypted contents;
decrypting the encrypted contents of the query on a trusted hardware;
executing the query on the trusted hardware using one or more semantically secure query operators, wherein a cardinality of an output of a query operation associated with at least one of the one or more semantically secure query operators is not discernible;
enforcing an upper bound on the cardinality of the output; and
encrypting, on the trusted hardware, the output.

16. One or more computer readable storage media as claim 15 recites, wherein one or more rows of an output of the operation are truncated when the output size of the operation is larger than an upper bound.

17. One or more computer readable storage media as claim 15 recites, wherein for individual ones of the one or more semantically secure query operators, an output cardinality of an operation associated with the semantically secure query operator equals an upper bound if the output cardinality is based, at least in part, on a query parameter.

18. One or more computer readable storage media as claim 15 recites, wherein individual ones of the one or more semantically secure query operators utilize an external memory oblivious access pattern.

19. One or more computer readable storage media as claim 15 recites, wherein the one or more semantically secure query operators includes at least one of a group-by or aggregation operator.

20. One or more computer readable storage media as claim 15 recites, wherein the one or more semantically secure query operators includes an anti join operator.

* * * * *